US012608104B1

(12) United States Patent
Liu et al.

(10) Patent No.: US 12,608,104 B1
(45) Date of Patent: Apr. 21, 2026

(54) TOUCH DRIVING DEVICE AND OPERATING METHOD THEREOF

(71) Applicant: Novatek Microelectronics Corp., Hsinchu (TW)

(72) Inventors: I-Te Liu, Hsinchu County (TW); Chih-Wei Ku, New Taipei City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/919,364

(22) Filed: Oct. 17, 2024

(51) Int. Cl.
*G06F 3/041* (2006.01)

(52) U.S. Cl.
CPC .... *G06F 3/041661* (2019.05); *G06F 3/04164* (2019.05); *G06F 3/04182* (2019.05)

(58) Field of Classification Search
CPC ...... G06F 3/041–047; G06F 2203/041–04114; G06F 3/04166; G06F 3/041661; G06F 3/0446; G06F 3/0412; G06F 3/044; G06F 3/0443; G06F 3/0416; G06F 3/04182; G06F 3/04184; G06F 3/041662; G06F 3/0418; G06F 2203/04108; G06F 3/0445; H10K 59/40
See application file for complete search history.

(56) References Cited

U.S. PATENT DOCUMENTS

| | | | | |
|---|---|---|---|---|
| 2015/0338992 A1* | 11/2015 | Kuo | ...................... | G06F 3/0446 |
| | | | | 345/178 |
| 2023/0020075 A1* | 1/2023 | Lin | ...................... | G06F 3/04162 |

FOREIGN PATENT DOCUMENTS

TW        M603129 U        10/2020

OTHER PUBLICATIONS

"Office Action of Taiwan counterpart Application", issued on Sep. 16, 2025, p. 1-p. 6.

* cited by examiner

*Primary Examiner* — Sanjiv D. Patel
(74) *Attorney, Agent, or Firm* — JCIPRNET

(57) ABSTRACT
The disclosure provides a touch driving device and an operating method thereof. The touch driving device uses a transmitting matrix to drive multiple transmitting electrodes of a touch panel. The touch driving device includes a first driving circuit and a second driving circuit. During a same period, the first driving circuit uses a first transmitting sub-matrix of the transmitting matrix to drive a first transmitting electrode group of the transmitting electrodes, and the second driving circuit uses a second transmitting sub-matrix of the transmitting matrix to drive a second transmitting electrode group of the transmitting electrodes. The touch driving device reads a sensing result matrix corresponding to the transmitting matrix from multiple receiving electrodes of the touch panel.

7 Claims, 6 Drawing Sheets

| | Time | TX01 | TX02 | TX03 | TX04 | TX05 | TX06 | TX07 | TX08 | TX09 | TX10 | TX11 | TX12 | TX13 | TX14 | TX15 | TX16 |
|---|---|---|---|---|---|---|---|---|---|---|---|---|---|---|---|---|---|
| P61 | t1 | First transmitting sub-matrix | | | | | | | | | | | | | | Second transmitting sub-matrix | |
| | t2 | | | | | | | | | | | | | | | | |
| | t3 | | | | | | | | | | | | | | | | |
| | t4 | | | | | | | | | | | | | | | | |
| P62 | t5 | | | First transmitting sub-matrix | | | | | | | | | | Second transmitting sub-matrix | | | |
| | t6 | | | | | | | | | | | | | | | | |
| | t7 | | | | | | | | | | | | | | | | |
| | t8 | | | | | | | | | | | | | | | | |
| P63 | t9 | | | | | First transmitting sub-matrix | | | | | | Second transmitting sub-matrix | | | | | |
| | t10 | | | | | | | | | | | | | | | | |
| | t11 | | | | | | | | | | | | | | | | |
| | t12 | | | | | | | | | | | | | | | | |
| P64 | t13 | | | | | | | First transmitting sub-matrix | Second transmitting sub-matrix | | | | | | | | |
| | t14 | | | | | | | | | | | | | | | | |
| | t15 | | | | | | | | | | | | | | | | |
| | t16 | | | | | | | | | | | | | | | | |

111     112

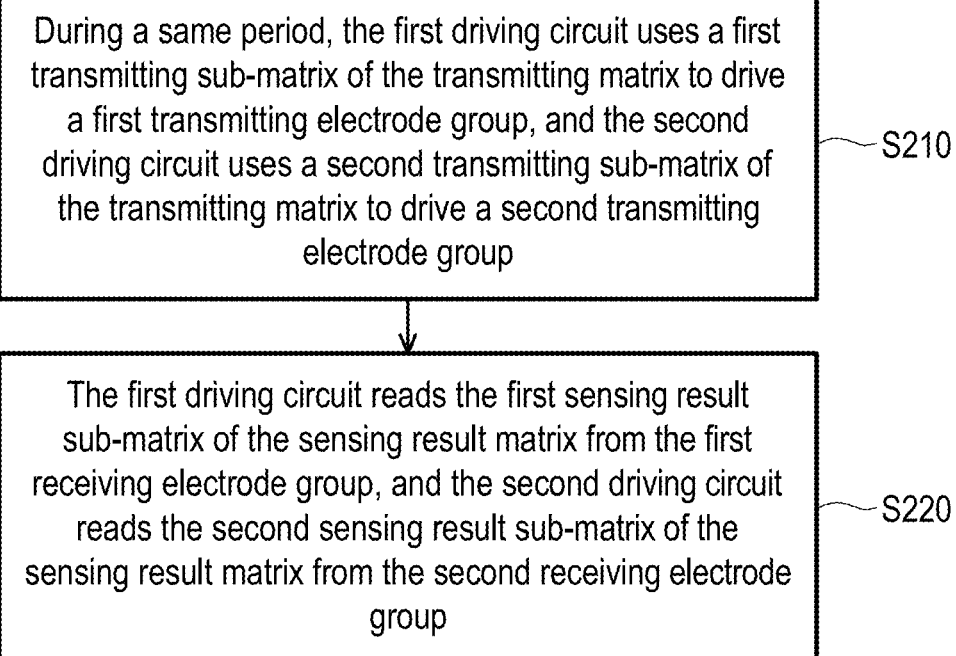

During a same period, the first driving circuit uses a first transmitting sub-matrix of the transmitting matrix to drive a first transmitting electrode group, and the second driving circuit uses a second transmitting sub-matrix of the transmitting matrix to drive a second transmitting electrode group ⁓S210

The first driving circuit reads the first sensing result sub-matrix of the sensing result matrix from the first receiving electrode group, and the second driving circuit reads the second sensing result sub-matrix of the sensing result matrix from the second receiving electrode group ⁓S220

FIG. 2

Figure 3:
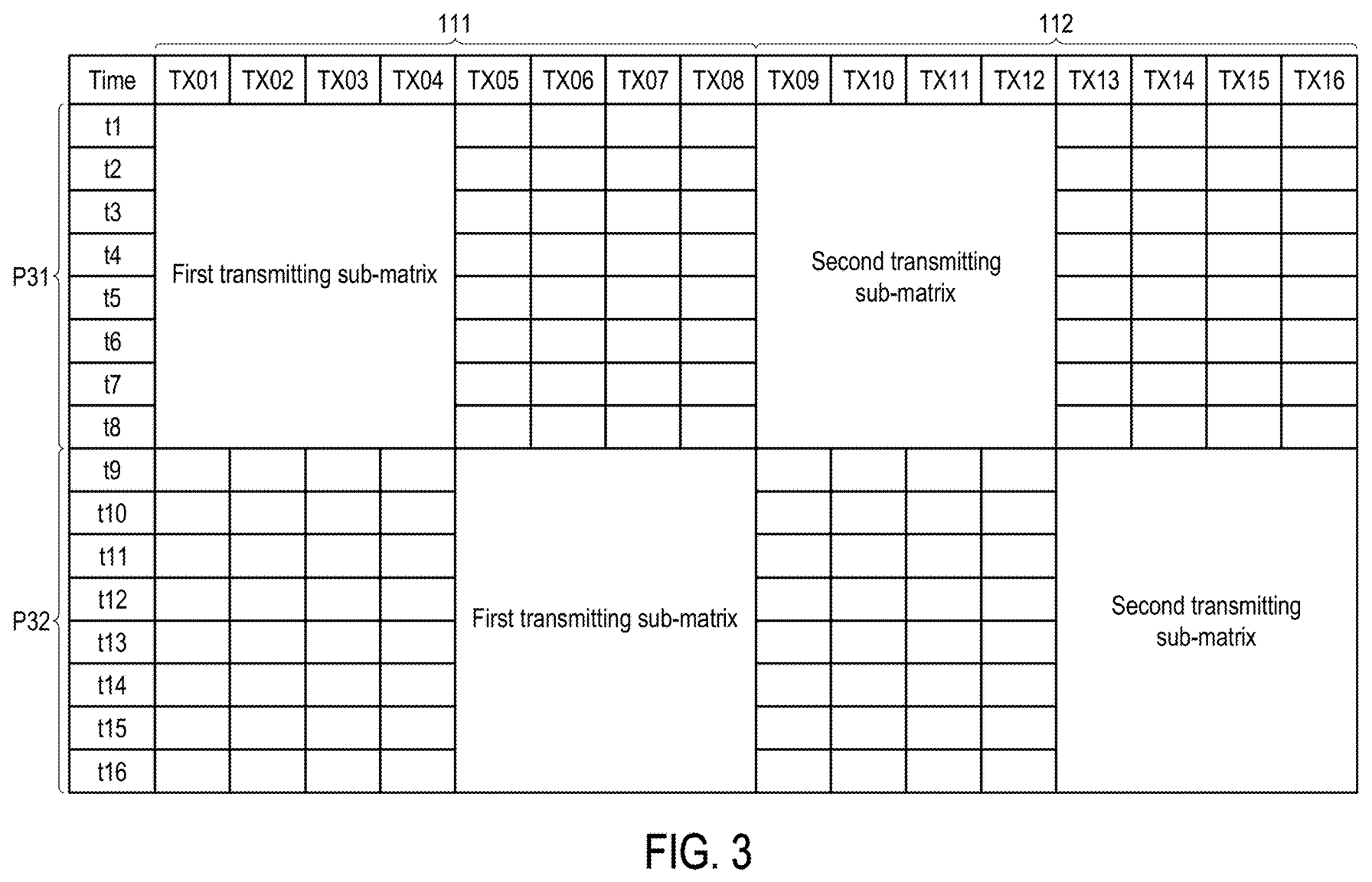

| Time | TX01 | TX02 | TX03 | TX04 | TX05 | TX06 | TX07 | TX08 | TX09 | TX10 | TX11 | TX12 | TX13 | TX14 | TX15 | TX16 |
|------|------|------|------|------|------|------|------|------|------|------|------|------|------|------|------|------|
| t1 | | | | | | | | | | | | | | | | |
| t2 | | | | | | | | | | | | | | | | |
| t3 | | | | | | | | | | | | | | | | |
| t4 | | | | | | | | | | | | | | | | |
| t5 | | | | | | | | | | | | | | | | |
| t6 | | | | | | | | | | | | | | | | |
| t7 | | | | | | | | | | | | | | | | |
| t8 | | | | | | | | | | | | | | | | |
| t9 | | | | | | | | | | | | | | | | |
| t10 | | | | | | | | | | | | | | | | |
| t11 | | | | | | | | | | | | | | | | |
| t12 | | | | | | | | | | | | | | | | |
| t13 | | | | | | | | | | | | | | | | |
| t14 | | | | | | | | | | | | | | | | |
| t15 | | | | | | | | | | | | | | | | |
| t16 | | | | | | | | | | | | | | | | |

111

112

First transmitting sub-matrix

Second transmitting sub-matrix

First transmitting sub-matrix

Second transmitting sub-matrix

| Time | TX01 | TX02 | TX03 | TX04 | TX05 | TX06 | TX07 | TX08 | TX09 | TX10 | TX11 | TX12 | TX13 | TX14 | TX15 | TX16 |
|------|------|------|------|------|------|------|------|------|------|------|------|------|------|------|------|------|
| t1 | | | | | | | | | | | | | | | | |
| t2 | | | | | | | | | | | | | | | | |
| t3 | First transmitting sub-matrix | | | | | | | | | | | Second transmitting sub-matrix | | | | |
| t4 | | | | | | | | | | | | | | | | |
| t5 | | | | | | | | | | | | | | | | |
| t6 | | | | | | | | | | | | | | | | |
| t7 | | | | | | | | | | | | | | | | |
| t8 | | | | | | | | | | | | | | | | |
| t9 | | | | | | | | | | | | | | | | |
| t10 | | | | | | | | | | | | | | | | |
| t11 | | | | | First transmitting sub-matrix | | | | | | | | Second transmitting sub-matrix | | | |
| t12 | | | | | | | | | | | | | | | | |
| t13 | | | | | | | | | | | | | | | | |
| t14 | | | | | | | | | | | | | | | | |
| t15 | | | | | | | | | | | | | | | | |
| t16 | | | | | | | | | | | | | | | | |

| Time | TX01 | TX02 | TX03 | TX04 | TX05 | TX06 | TX07 | TX08 | TX09 | TX10 | TX11 | TX12 | TX13 | TX14 | TX15 | TX16 |
|---|---|---|---|---|---|---|---|---|---|---|---|---|---|---|---|---|
| t1 | First transmitting sub-matrix | | | | | | | | Second transmitting sub-matrix | | | | | | | |
| t2 | | | | | | | | | | | | | | | | |
| t3 | | | | | | | | | | | | | | | | |
| t4 | | | | | | | | | | | | | | | | |
| t5 | | | First transmitting sub-matrix | | | | | | | | Second transmitting sub-matrix | | | | | |
| t6 | | | | | | | | | | | | | | | | |
| t7 | | | | | | | | | | | | | | | | |
| t8 | | | | | | | | | | | | | | | | |
| t9 | | | | | First transmitting sub-matrix | | | | | | | | Second transmitting sub-matrix | | | |
| t10 | | | | | | | | | | | | | | | | |
| t11 | | | | | | | | | | | | | | | | |
| t12 | | | | | | | | | | | | | | | | |
| t13 | | | | | | | First transmitting sub-matrix | | | | | | | | Second transmitting sub-matrix | |
| t14 | | | | | | | | | | | | | | | | |
| t15 | | | | | | | | | | | | | | | | |
| t16 | | | | | | | | | | | | | | | | |

| Time | TX01 | TX02 | TX03 | TX04 | TX05 | TX06 | TX07 | TX08 | TX09 | TX10 | TX11 | TX12 | TX13 | TX14 | TX15 | TX16 |
|------|------|------|------|------|------|------|------|------|------|------|------|------|------|------|------|------|
| t1 | First transmitting sub-matrix | | | | | | | | | | | | | | | Second transmitting sub-matrix |
| t2 | | | | | | | | | | | | | | | | |
| t3 | | | | | | | | | | | | | | | | |
| t4 | | | | | | | | | | | | | | | | |
| t5 | | | First transmitting sub-matrix | | | | | | | | | | | | Second transmitting sub-matrix | |
| t6 | | | | | | | | | | | | | | | | |
| t7 | | | | | | | | | | | | | | | | |
| t8 | | | | | | | | | | | | | | | | |
| t9 | | | | | First transmitting sub-matrix | | | | | | | | Second transmitting sub-matrix | | | |
| t10 | | | | | | | | | | | | | | | | |
| t11 | | | | | | | | | | | | | | | | |
| t12 | | | | | | | | | | | | | | | | |
| t13 | | | | | | | First transmitting sub-matrix | | | | Second transmitting sub-matrix | | | | | |
| t14 | | | | | | | | | | | | | | | | |
| t15 | | | | | | | | | | | | | | | | |
| t16 | | | | | | | | | | | | | | | | |

FIG. 6

TOUCH DRIVING DEVICE AND OPERATING METHOD THEREOF

BACKGROUND

Technical Field

The disclosure relates to a touch device, and in particular relates to a touch driving device and an operating method thereof.

Description of Related Art

Based on factors such as the dimension, parasitic impedance, and circuit layout of the touch panel, the touch driving device adopts multiple driving circuits to drive different electrodes of the touch panel. In the prior art, these driving circuits alternately output transmission signals at different periods to drive different electrodes of the touch panel. No matter which driving circuit drives the touch panel, all driving circuits simultaneously read sensing results from multiple receiving electrodes of the touch panel. For example, during the first period when the first driving circuit outputs the transmission signal (driving signal) to drive the first transmitting electrode group of the touch panel, the second driving circuit does not output the transmission signal (driving signal). The first driving circuit and the second driving circuit simultaneously read sensing results from different receiving electrodes. On the contrary, during the second period when the second driving circuit outputs the transmission signal to drive the second transmitting electrode group of the touch panel, the first driving circuit does not output the transmission signal. The first driving circuit and the second driving circuit simultaneously read sensing results from different receiving electrodes.

During the first period when the first driving circuit drives the first transmitting electrode group, it is inevitable that the noise caused by the driving behavior will be coupled to the sensing results of the first driving circuit towards the touch panel through the internal coupling path of the first driving circuit, thereby introducing a jitter component into the sensing results. In contrast, with respect to the second driving circuit, during the first period when the first driving circuit drives the first transmitting electrode group, since the second driving circuit has no driving behavior, the sensing result of the second driving circuit towards the touch panel does not have a jitter component corresponding to the noise of the driving behavior (alternatively, the jitter component of the sensing result of the second driving circuit is inconsistent with the jitter component of the sensing result of the first driving circuit).

Generally speaking, consistent jitter components in the sensing results of different driving circuits can be filtered out or improved by software and/or hardware. In the prior art, due to these driving circuits alternately outputting transmission signals to drive different electrodes of the touch panel in different periods, the jitter components of the sensing results of different driving circuits are inconsistent with each other. The phenomenon of inconsistent jitter may cause the post-stage circuit to misjudge the touch event of the touch panel.

It should be noted that the content of the "BACKGROUND" section is used to help understand the disclosure. Some of the content (or all of the content) disclosed in the "BACKGROUND" section may not be known by those of ordinary skill in the art. The content disclosed in the "BACKGROUND" section does not mean that the content has been known to those with ordinary knowledge in the technical field before the application of the disclosure.

SUMMARY

A touch driving device and an operating method thereof to drive the transmitting electrode of the touch panel are provided in the disclosure.

In an embodiment of the disclosure, the touch driving device drives multiple transmitting electrodes of a touch panel by using a transmitting matrix, and reads a sensing result matrix corresponding to the transmitting matrix from multiple receiving electrodes of the touch panel. The touch driving device includes a first driving circuit and a second driving circuit. The first driving circuit is coupled to a first transmitting electrode group of the transmitting electrodes and to a first receiving electrode group of the receiving electrodes. The first driving circuit uses a first transmitting sub-matrix of the transmitting matrix to drive the first transmitting electrode group during a first period, and reads a first sensing result sub-matrix of the sensing result matrix from the first receiving electrode group. The second driving circuit is coupled to a second transmitting electrode group of the transmitting electrodes and to a second receiving electrode group of the receiving electrodes. The second driving circuit uses a second transmitting sub-matrix of the transmitting matrix to drive the second transmitting electrode group during the first period, and reads a second sensing result sub-matrix of the sensing result matrix from the second receiving electrode group.

In an embodiment of the disclosure, the operating method includes the following operation. During a first period, a first transmitting sub-matrix of a transmitting matrix is used to drive a first transmitting electrode group of multiple transmitting electrodes by a first driving circuit of the touch driving device. A second transmitting sub-matrix of the transmitting matrix is used to drive a second transmitting electrode group of the transmitting electrodes by a second driving circuit of the touch driving device. A first sensing result sub-matrix of a sensing result matrix is read from a first receiving electrode group of multiple receiving electrodes by the first driving circuit. A second sensing result sub-matrix of the sensing result matrix is read from a second receiving electrode group of the receiving electrodes by the second driving circuit.

Based on the above, the first driving circuit and the second driving circuit described in the embodiments of the disclosure use different transmitting sub-matrices of the same transmitting matrix to drive different transmitting electrode groups of the touch panel during the same period, so that the jitter components of the sensing results of different driving circuits are consistent (or similar) to each other. The jitter component refers to the phenomenon that noise caused by driving behavior is coupled to the sensing result through the internal coupling path of the driving circuit. Due to the jitter components of the sensing results of the first driving circuit and the second driving circuit being consistent (or similar) to each other, the situation in which the post-stage circuit misjudges the touch event of the touch panel can be effectively reduced.

In order to make the above-mentioned features and advantages of the disclosure comprehensible, embodiments accompanied with drawings are described in detail below.

3

Figure 1:
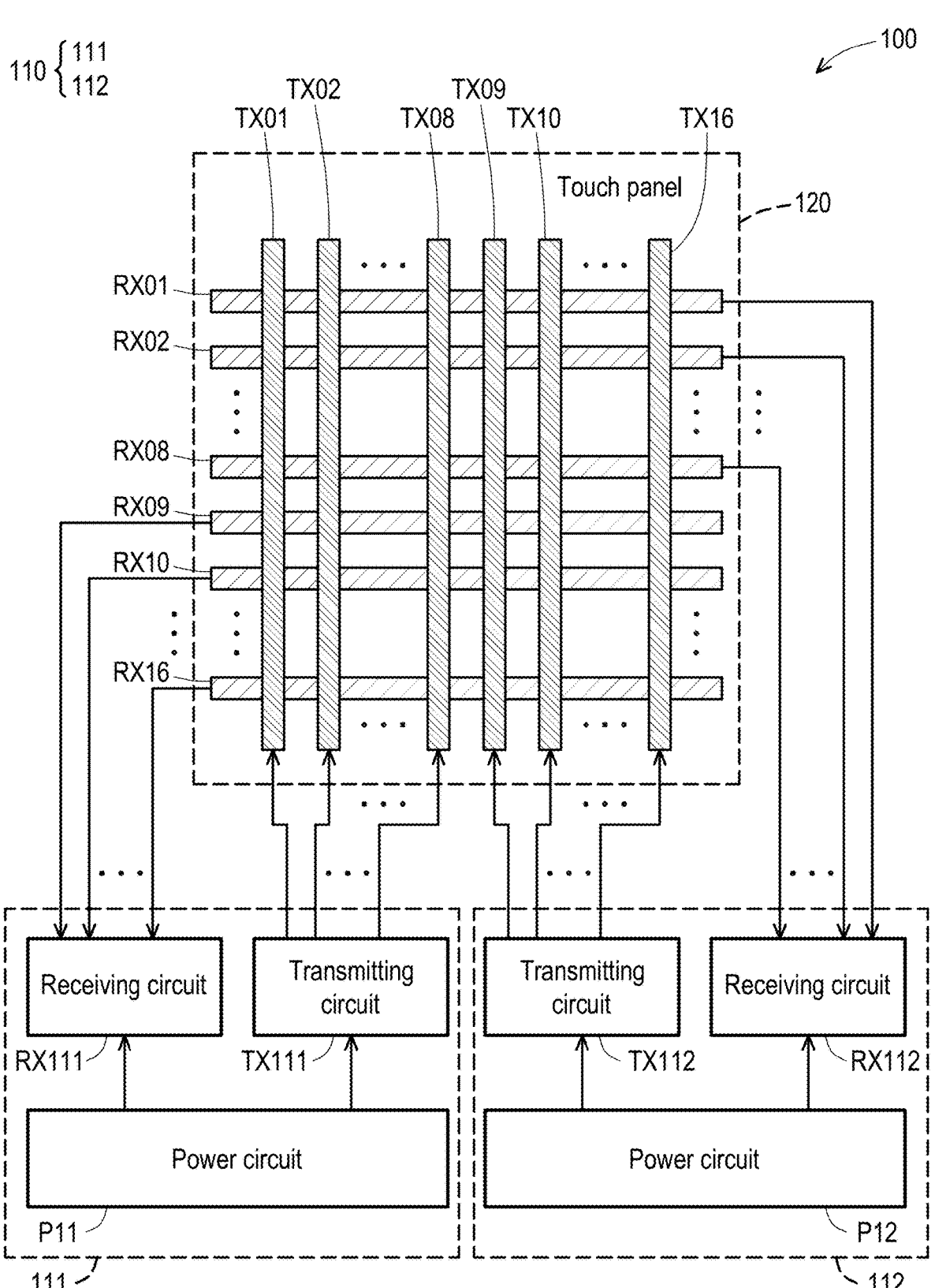
FIG. 1 is a circuit block schematic diagram of a touch apparatus according to an embodiment of the disclosure.

FIG. 2 is a schematic flowchart of an operating method of a touch driving device according to an embodiment of the disclosure.

FIG. 3 is a driving timing schematic diagram of the transmitting electrodes according to an embodiment of the disclosure.

FIG. 4 is a driving timing schematic diagram of the transmitting electrode according to another embodiment of the disclosure.

FIG. 5 is a driving timing schematic diagram of the transmitting electrode according to yet another embodiment of the disclosure.

FIG. 6 is a driving timing schematic diagram of the transmitting electrode according to yet another embodiment of the disclosure.

DETAILED DESCRIPTION OF DISCLOSED EMBODIMENTS

The term "coupled (or connected)" as used throughout this specification (including the scope of the application) may refer to any direct or indirect means of connection. For example, if it is described in the specification that a first device is coupled (or connected) to a second device, it should be construed that the first device can be directly connected to the second device, or the first device can be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a circuit block schematic diagram of a touch apparatus 100 according to an embodiment of the disclosure. The touch apparatus 100 shown in FIG. 1 includes a touch driving device 110 and a touch panel 120. Based on actual design and application, the touch panel 120 may be any type of touch panel. For example, the touch panel 120 may be a touch panel with a display function. The touch panel 120 has multiple transmitting electrodes (e.g., transmitting electrodes TX01, TX02, . . . , TX08, TX09, TX10, . . . , TX16) and multiple receiving electrodes (e.g., receiving electrodes RX01, RX02, . . . , RX08, RX09, RX10, . . . , RX16). In any case, the specific number of transmitting electrodes and the specific number of receiving electrodes can be determined according to the actual design and application.

The touch driving device 110 uses a transmitting matrix to drive the transmitting electrodes TX01 to TX16 of the touch panel 120. The specific encoding of the transmitting matrix can be determined according to the actual design and application. For example (but not limited thereto), a specific encoding example of the transmitting matrix may be the following Matrix 1, Matrix 2, Matrix 3, Matrix 4 or Matrix 5. In Matrix 1, Matrix 2, Matrix 3, Matrix 4 or Matrix 5, the vertical axis represents time and the horizontal axis represents the different transmitting electrodes. The touch driving device 110 reads the sensing result matrix corresponding to the transmitting matrix from the receiving electrodes RX01 to RX16 of the touch panel 120. Based on the specific encoding of the transmitting matrix, the post-stage circuit (not shown) can decode the sensing result matrix to correctly determine the position of the touch event of the touch panel 120.

| Matrix 1: | | | | | | | | |
| --- | --- | --- | --- | --- | --- | --- | --- | --- |
| Time | TX[1] | TX[2] | TX[3] | TX[4] | TX[5] | TX[6] | TX[7] | TX[8] |
| T1 | 1 | 1 | -1 | -1 | -1 | -1 | 1 | -1 |
| T2 | 1 | -1 | -1 | -1 | -1 | 1 | -1 | 1 |
| T3 | -1 | -1 | -1 | -1 | 1 | -1 | 1 | 1 |
| T4 | -1 | -1 | -1 | 1 | -1 | 1 | 1 | -1 |
| T5 | -1 | -1 | 1 | -1 | 1 | 1 | -1 | -1 |
| T6 | -1 | 1 | -1 | 1 | 1 | -1 | -1 | -1 |
| T7 | 1 | -1 | 1 | 1 | -1 | -1 | -1 | -1 |
| T8 | -1 | 1 | 1 | -1 | -1 | -1 | -1 | 1 |

| Matrix 2: | | | | | | | | |
| --- | --- | --- | --- | --- | --- | --- | --- | --- |
| Time | TX[1] | TX[2] | TX[3] | TX[4] | TX[5] | TX[6] | TX[7] | TX[8] |
| T1 | -1 | 1 | 1 | 1 | 0 | 1 | 1 | -1 |
| T2 | 1 | -1 | 1 | 1 | -1 | 0 | 1 | 1 |
| T3 | 1 | 1 | -1 | 1 | 1 | -1 | 0 | 1 |
| T4 | 1 | 1 | 1 | -1 | 1 | 1 | -1 | 0 |
| T5 | 0 | 1 | 1 | -1 | -1 | 1 | 1 | 1 |
| T6 | -1 | 0 | 1 | 1 | 1 | -1 | 1 | 1 |
| T7 | 1 | -1 | 0 | 1 | 1 | 1 | -1 | 1 |
| T8 | 1 | 1 | -1 | 0 | 1 | 1 | 1 | -1 |

| Matrix 3: | | | | | | | | |
| --- | --- | --- | --- | --- | --- | --- | --- | --- |
| Time | TX[1] | TX[2] | TX[3] | TX[4] | TX[5] | TX[6] | TX[7] | TX[8] |
| T1 | 1 | -1 | 1 | -1 | 0 | -1 | -1 | 1 |
| T2 | -1 | 1 | -1 | 1 | 1 | 0 | -1 | -1 |
| T3 | 1 | -1 | 1 | -1 | -1 | 1 | 0 | -1 |
| T4 | -1 | 1 | -1 | 1 | -1 | -1 | 1 | 0 |
| T5 | 0 | -1 | -1 | 1 | 1 | -1 | 1 | -1 |
| T6 | 1 | 0 | -1 | -1 | -1 | 1 | -1 | 1 |
| T7 | -1 | 1 | 0 | -1 | 1 | -1 | 1 | -1 |
| T8 | -1 | -1 | 1 | 0 | -1 | 1 | -1 | 1 |

| Matrix 4: | | | |
| --- | --- | --- | --- |
| Time | TX[1] | TX[2] | TX[3] | TX[4] |
| T1 | -1 | 0 | 1 | -1 |
| T2 | 0 | -1 | -1 | 1 |
| T3 | 1 | -1 | -1 | 0 |
| T4 | -1 | 1 | 0 | -1 |

| Matrix 5: | | | |
| --- | --- | --- | --- |
| Time | TX[1] | TX[2] | TX[3] | TX[4] |
| T1 | 1 | 1 | 1 | 0 |
| T2 | 1 | 1 | 0 | 1 |
| T3 | 1 | 0 | 1 | 1 |
| T4 | 0 | 1 | 1 | 1 |

In the above Matrix 1, Matrix 2, Matrix 3, Matrix 4 or Matrix 5, the horizontal axis represents the transmitting electrodes TX [1], TX [2], TX [3], TX [4], TX [5], TX [6], TX [7] and TX [8], while the vertical axis represents times T1, T2, T3, T4, T5, T6, T7 and T8. In the above Matrix 1, Matrix 2, Matrix 3, Matrix 4 or Matrix 5, "1" represents the first type of driving waveform, "−1" represents the second type of driving waveform, and "0" represents the third type of driving waveform. For example (but not limited thereto), "1" represents "one or more positive pulses (e.g., pulses from a common voltage to a high voltage greater than the common voltage)", "−1" represents "one or more negative pulses (e.g., pulses from a common voltage to a low voltage less than the common voltage)", and "0" represents "a waveform that remains at a certain DC level (e.g., a common voltage)".

In the embodiment shown in FIG. 1, the touch driving device 110 includes a driving circuit 111 and a driving circuit 112. According to different designs, in some embodiments, the implementation of the driving circuit 111 and/or the driving circuit 112 may be a hardware circuit. In other embodiments, the driving circuit 111 and/or the driving circuit 112 may be implemented in the form of hardware, firmware, software (i.e., program), or any combination of the foregoing.

In terms of hardware, the above-mentioned driving circuit 111 and/or the driving circuit 112 can be implemented as a logic circuit on an integrated circuit. For example, the above-mentioned related functions of the driving circuit 111 and/or the driving circuit 112 can be implemented in one or more hardware controllers, microcontrollers, hardware processors, microprocessors, application-specific integrated circuits (ASICs), digital signal processors (DSPs), field programmable gate arrays (FPGAs), central processing units (CPUs) and/or various logic blocks, modules, and circuits in other processing units. The above-mentioned related functions of the driving circuit 111 and/or the driving circuit 112 can be implemented as hardware circuits by using hardware description languages (e.g., Verilog HDL or VHDL), or other suitable programming languages, such as various logic blocks, modules, and circuits in integrated circuits.

In terms of software and/or firmware, the above-mentioned related functions of the driving circuit 111 and/or the driving circuit 112 can be implemented as programming codes. For example, the driving circuit 111 and/or the driving circuit 112 may be implemented using general programming languages (e.g., C, C++, or assembly language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic device (e.g., a computer, a CPU, a hardware controller, a microcontroller, a hardware processor, or a microprocessor) can read and execute the programming code from the non-transitory machine-readable storage medium, thereby achieving related functions of the driving circuit 111 and/or the driving circuit 112.

In the embodiment shown in FIG. 1, the driving circuit 111 is coupled to the first transmitting electrode group of the transmitting electrodes TX01 to TX16 (e.g., the transmitting electrodes TX01 to TX08, but not limited thereto), and is coupled to the first receiving electrode group of the receiving electrodes RX01 to RX16 (e.g., the receiving electrodes RX09 to RX16, but not limited thereto). The driving circuit 112 is coupled to the second transmitting electrode group of the transmitting electrodes TX01 to TX16 (e.g., the transmitting electrodes TX09 to TX16, but not limited thereto), and is coupled to the second receiving electrode group of the receiving electrodes RX01 to RX16 (e.g., the receiving electrodes RX01 to RX08, but not limited thereto).

FIG. 2 is a schematic flowchart of an operating method of a touch driving device according to an embodiment of the disclosure. A specific encoding example of the transmitting matrix may be the above-mentioned Matrix 1, Matrix 2, Matrix 3, Matrix 4, Matrix 5 or other transmitting matrices. The transmitting matrix may be split into at least a first transmitting sub-matrix and a second transmitting sub-matrix. Referring to FIG. 1 and FIG. 2, during the same period (e.g., the first period), the driving circuit 111 uses a first transmitting sub-matrix of a transmitting matrix to drive a first transmitting electrode group of the transmitting electrodes TX01 to TX16, and the driving circuit 112 uses a second transmitting sub-matrix of the transmitting matrix to drive a second transmitting electrode group of the transmitting electrodes TX01 to TX16 (step S210). Based on the driving of the transmitting electrodes TX01 to TX16, the driving circuits 111 and 112 read a sensing result matrix corresponding to the transmitting matrix from the receiving electrodes RX01 to RX16. For example, during the first period, the driving circuit 111 reads a first sensing result sub-matrix of the sensing result matrix from the first receiving electrode group, and the driving circuit 112 reads a second sensing result sub-matrix of the sensing result matrix from the second receiving electrode group (step S220). Based on the specific encoding of the transmitting matrix, the post-stage circuit (not shown) can decode the sensing result matrix to correctly determine the position of the touch event of the touch panel 120.

FIG. 3 is a driving timing schematic diagram of the transmitting electrodes TX01 to TX16 according to an embodiment of the disclosure. The horizontal axis of FIG. 3 represents the transmitting electrodes TX01 to TX16, while the vertical axis represents different times t1, t2, t3, t4, t5, t6, 7, t8, t9, t10, t11, t12, t13, t14, t15 and t16. Referring to FIG. 1 and FIG. 3, during the same period (e.g., the first period P31, times t1 to t8), the driving circuit 111 uses the first transmitting sub-matrix of the transmitting matrix to drive the first transmitting electrodes TX01 to TX04 in the first transmitting electrode group, and the driving circuit 112 uses the second transmitting sub-matrix of the transmitting matrix to drive the first transmitting electrodes TX09 to TX12 in the second transmitting electrode group.

During the first period P31 when the driving circuit 111 drives the first transmitting electrodes TX01 to TX04, it is inevitable that the noise caused by the driving behavior will be coupled to the sensing results of the driving circuit 111 towards the touch panel 120 through the internal coupling path (e.g., power network) of the driving circuit 111, thereby introducing a jitter component into the sensing results. Similarly, during the first period P31 when the driving circuit 112 drives the first transmitting electrodes TX09 to TX12, the noise caused by the driving behavior will be coupled to the sensing results of the driving circuit 112 towards the touch panel 120 through the internal coupling path of the driving circuit 112, thereby introducing a jitter component into the sensing results. The jitter component refers to the phenomenon that noise caused by driving behavior is coupled to the sensing result through the internal coupling path of the driving circuit. The driving circuits 111 and 112 use different transmitting sub-matrices of the same transmitting matrix to drive different transmitting electrode groups of the touch panel 120 during the same period P31. Due to the driving circuits 111 and 112 both driving the touch panel 120 during the same period P31, the jitter components of the sensing results of the different driving circuits 111 and 112 are consistent (or similar) to each other. Due to the jitter components of the sensing results of the driving circuit 111 and the driving circuit 112 being consistent (or similar) to each other, the situation in which the post-stage circuit (not shown) misjudges the touch event of the touch panel 120 can be effectively reduced.

Similarly, it can be inferred that during another same period (e.g., the second period P32, times t9 to t16), the driving circuit 111 uses the first transmitting sub-matrix to drive the second transmitting electrodes TX05 to TX08 in the first transmitting electrode group, and the driving circuit 112 uses the second transmitting sub-matrix to drive the second transmitting electrodes TX13 to TX16 in the second transmitting electrode group. Due to the driving circuits 111 and 112 both driving the touch panel 120 during the same period P32, the jitter components of the sensing results of the different driving circuits 111 and 112 are consistent (or similar) to each other.

Taking the above Matrix 1 as an example, Matrix 1 can be split into a first transmitting sub-matrix (e.g., the left half of Matrix 1, that is, the range of the transmitting electrodes TX [1] to TX [4]) and a second transmitting sub-matrix (e.g., the right half of Matrix 1, that is, the range of the transmitting electrodes TX [5] to TX [8]). In the first period P31 shown in FIG. 3 (equivalent to the time T1 to T8 of Matrix 1), the driving circuit 111 uses the first transmitting sub-matrix (left half of Matrix 1) to drive the first transmitting electrodes TX01 to TX04 (equivalent to the transmitting electrodes TX [1] to TX [4] of Matrix 1) in the first transmitting electrode group, and the driving circuit 112 uses the second transmitting sub-matrix (right half of Matrix 1) to drive the first transmitting electrodes TX09 to TX12 (equivalent to the transmitting electrodes TX [5] to TX [8] of Matrix 1) in the second transmitting electrode group. Based on the driving of the transmitting electrodes TX01 to TX04 and the transmitting electrodes TX09 to TX12, the driving circuit 111 reads the first sensing result sub-matrix of the sensing result matrix from the receiving electrodes RX09 to RX16 in the first period P31, and the driving circuit 112 reads the second sensing result sub-matrix of the sensing result matrix from the receiving electrodes RX01 to RX08 in the first period P31. Based on the specific encoding of the transmitting matrix, the post-state circuit (not shown) can decode the sensing result matrix in the first period P31 to correctly determine the touch events in the range where the transmitting electrodes TX01 to TX04 and the transmitting electrodes TX09 to TX12 are located.

In the second period P32 shown in FIG. 3 (equivalent to the time T1 to T8 of Matrix 1), the driving circuit 111 uses the first transmitting sub-matrix (left half of Matrix 1) to drive the second transmitting electrodes TX05 to TX08 (equivalent to the transmitting electrodes TX [1] to TX [4] of Matrix 1) in the first transmitting electrode group, and the driving circuit 112 uses the second transmitting sub-matrix (right half of Matrix 1) to drive the second transmitting electrodes TX13 to TX16 (equivalent to the transmitting electrodes TX [5] to TX [8] of Matrix 1) in the second transmitting electrode group. Based on the driving of the transmitting electrodes TX05 to TX08 and the transmitting electrodes TX13 to TX16, the driving circuit 111 reads the first sensing result sub-matrix of the sensing result matrix from the receiving electrodes RX09 to RX16 in the second period P32, and the driving circuit 112 reads the second sensing result sub-matrix of the sensing result matrix from the receiving electrodes RX01 to RX08 in the second period P32. The post-state circuit (not shown) can decode the sensing result matrix in the second period P32 to correctly determine the touch events in the range where the transmitting electrodes TX05 to TX08 and the transmitting electrodes TX13 to TX16 are located.

Similarly, Matrix 2 can be split into a first transmitting sub-matrix (e.g., the left half of Matrix 2, that is, the range of the transmitting electrodes TX [1] to TX [4]) and a second transmitting sub-matrix (e.g., the right half of Matrix 2, that is, the range of the transmitting electrodes TX [5] to TX [8]). Based on the above relevant descriptions about Matrix 1 and by analogy, the first transmitting sub-matrix and the second transmitting sub-matrix of Matrix 2 can also be applied to the embodiment shown in FIG. 3. Matrix 3 can also be split into a first transmitting sub-matrix (e.g., the left half of Matrix 3, that is, the range of the transmitting electrodes TX [1] to TX [4]) and a second transmitting sub-matrix (e.g., the right half of Matrix 3, that is, the range of the transmitting electrodes TX [5] to TX [8]). Based on the above relevant descriptions about Matrix 1 and by analogy, the first transmitting sub-matrix and the second transmitting sub-matrix of Matrix 3 can also be applied to the embodiment shown in FIG. 3.

FIG. 4 is a driving timing schematic diagram of the transmitting electrodes TX01 to TX16 according to another embodiment of the disclosure. The horizontal axis of FIG. 4 represents the transmitting electrodes TX01 to TX16, while the vertical axis represents different times t1 to t16. Referring to FIG. 1 and FIG. 4, during the same period (e.g., the first period P41, times t1 to t8), the driving circuit 111 uses the first transmitting sub-matrix of the transmitting matrix to drive the first transmitting electrodes TX01 to TX04 in the first transmitting electrode group, and the driving circuit 112 uses the second transmitting sub-matrix of the transmitting matrix to drive the first transmitting electrodes TX13 to TX16 in the second transmitting electrode group. The driving circuits 111 and 112 use different transmitting sub-matrices of the same transmitting matrix to drive different transmitting electrode groups of the touch panel 120 during the same period P41. Due to the driving circuits 111 and 112 both driving the touch panel 120 during the same period P41, the jitter components of the sensing results of the different driving circuits 111 and 112 are consistent (or similar) to each other.

Similarly, it can be inferred that during another same period (e.g., the second period P42, times t9 to t16), the driving circuit 111 uses the first transmitting sub-matrix to drive the second transmitting electrodes TX05 to TX08 in the first transmitting electrode group, and the driving circuit 112 uses the second transmitting sub-matrix to drive the second transmitting electrodes TX09 to TX12 in the second transmitting electrode group. Due to the driving circuits 111 and 112 both driving the touch panel 120 during the same period P42, the jitter components of the sensing results of the different driving circuits 111 and 112 are consistent (or similar) to each other.

Taking the above Matrix 1 as an example, Matrix 1 can be split into a first transmitting sub-matrix (e.g., the left half of Matrix 1, that is, the range of the transmitting electrodes TX [1] to TX [4]) and a second transmitting sub-matrix (e.g., the right half of Matrix 1, that is, the range of the transmitting electrodes TX [5] to TX [8]). In the first period P41 shown in FIG. 4 (equivalent to the time T1 to T8 of Matrix 1), the driving circuit 111 uses the first transmitting sub-matrix (left half of Matrix 1) to drive the first transmitting electrodes TX01 to TX04 (equivalent to the transmitting electrodes TX [1] to TX [4] of Matrix 1) in the first transmitting electrode group, and the driving circuit 112 uses the second transmitting sub-matrix (right half of Matrix 1) to drive the first transmitting electrodes TX13 to TX16 (equivalent to the transmitting electrodes TX [5] to TX [8] of Matrix 1) in the second transmitting electrode group. Based on the driving of the transmitting electrodes TX01 to TX04 and the transmitting electrodes TX13 to TX16, the driving circuit 111 reads the first sensing result sub-matrix of the sensing result matrix from the receiving electrodes RX09 to RX16 in the first period P41, and the driving circuit 112 reads the second sensing result sub-matrix of the sensing result matrix from the receiving electrodes RX01 to RX08 in the first period P41. Based on the specific encoding of the transmitting matrix, the post-state circuit (not shown) can decode the sensing result matrix in the first period P41 to correctly determine the touch events in the range where the transmitting electrodes TX01 to TX04 and the transmitting electrodes TX13 to TX16 are located.

In the second period P42 shown in FIG. 4 (equivalent to the time T1 to T8 of Matrix 1), the driving circuit 111 uses the first transmitting sub-matrix (left half of Matrix 1) to drive the second transmitting electrodes TX05 to TX08 (equivalent to the transmitting electrodes TX [1] to TX [4] of Matrix 1) in the first transmitting electrode group, and the driving circuit 112 uses the second transmitting sub-matrix (right half of Matrix 1) to drive the second transmitting electrodes TX09 to TX12 (equivalent to the transmitting electrodes TX [5] to TX [8] of Matrix 1) in the second transmitting electrode group. Based on the driving of the transmitting electrodes TX05 to TX12, the driving circuit 111 reads the first sensing result sub-matrix of the sensing result matrix from the receiving electrodes RX09 to RX16 in the second period P42, and the driving circuit 112 reads the second sensing result sub-matrix of the sensing result matrix from the receiving electrodes RX01 to RX08 in the second period P42. The post-state circuit (not shown) can decode the sensing result matrix in the second period P42 to correctly determine the touch events in the range where the transmitting electrodes TX05 to TX12 are located.

Based on the above relevant descriptions about Matrix 1 and by analogy, the first transmitting sub-matrix (e.g., the left half of Matrix 2, that is, the range of the transmitting electrodes TX [1] to TX [4]) and the second transmitting sub-matrix (e.g., the right half of Matrix 2, that is, the range of the transmitting electrodes TX [5] to TX [8]) of Matrix 2 can also be applied to the embodiment shown in FIG. 4. Alternatively, based on the above relevant descriptions about Matrix 1 and by analogy, the first transmitting sub-matrix (e.g., the left half of Matrix 3, that is, the range of the transmitting electrodes TX [1] to TX [4]) and the second transmitting sub-matrix (e.g., the right half of Matrix 3, that is, the range of the transmitting electrodes TX [5] to TX [8]) of Matrix 3 can also be applied to the embodiment shown in FIG. 4.

FIG. 5 is a driving timing schematic diagram of the transmitting electrodes TX01 to TX16 according to yet another embodiment of the disclosure. The horizontal axis of FIG. 5 represents the transmitting electrodes TX01 to TX16, while the vertical axis represents different times t1 to t16. Referring to FIG. 1 and FIG. 5, during the same period (e.g., the first period P51, times t1 to t4), the driving circuit 111 uses the first transmitting sub-matrix of the transmitting matrix to drive the first transmitting electrodes TX01 to TX02 in the first transmitting electrode group, and the driving circuit 112 uses the second transmitting sub-matrix of the transmitting matrix to drive the first transmitting electrodes TX09 to TX10 in the second transmitting electrode group. The driving circuits 111 and 112 use different transmitting sub-matrices of the same transmitting matrix to drive different transmitting electrode groups of the touch panel 120 during the same period P51. Due to the driving circuits 111 and 112 both driving the touch panel 120 during the same period P51, the jitter components of the sensing results of the different driving circuits 111 and 112 are consistent (or similar) to each other.

Similarly, it can be inferred that during another same period (e.g., the second period P52, times t5 to t8), the driving circuit 111 uses the first transmitting sub-matrix to drive the second transmitting electrodes TX03 to TX04 in the first transmitting electrode group, and the driving circuit 112 uses the second transmitting sub-matrix to drive the second transmitting electrodes TX11 to TX12 in the second transmitting electrode group. During the third period P53 (times t9 to t12), the driving circuit 111 uses the first transmitting sub-matrix to drive the third transmitting electrodes TX05 to TX06 in the first transmitting electrode group, and the driving circuit 112 uses the second transmitting sub-matrix to drive the third transmitting electrodes TX13 to TX14 in the second transmitting electrode group. During the fourth period P54 (times t13 to t16), the driving circuit 111 uses the first transmitting sub-matrix to drive the fourth transmitting electrodes TX07 to TX08 in the first transmitting electrode group, and the driving circuit 112 uses the second transmitting sub-matrix to drive the fourth transmitting electrodes TX15 to TX16 in the second transmitting electrode group.

Taking the above Matrix 4 as an example, Matrix 4 can be split into a first transmitting sub-matrix (e.g., the left half of Matrix 4, that is, the range of the transmitting electrodes TX [1] to TX [2]) and a second transmitting sub-matrix (e.g., the right half of Matrix 4, that is, the range of the transmitting electrodes TX [3] to TX [4]). In the first period P51 shown in FIG. 5 (equivalent to the time T1 to T4 of Matrix 4), the driving circuit 111 uses the first transmitting sub-matrix (left half of Matrix 4) to drive the first transmitting electrodes TX01 to TX02 (equivalent to the transmitting electrodes TX [1] to TX [2] of Matrix 4) in the first transmitting electrode group, and the driving circuit 112 uses the second transmitting sub-matrix (right half of Matrix 4) to drive the first transmitting electrodes TX09 to TX10 (equivalent to the transmitting electrodes TX [3] to TX [4] of Matrix 4) in the second transmitting electrode group. Based on the driving of the transmitting electrodes TX01 to TX02 and the transmitting electrodes TX09 to TX10, the driving circuit 111 reads the first sensing result sub-matrix of the sensing result matrix from the receiving electrodes RX09 to RX16 in the first period P51, and the driving circuit 112 reads the second sensing result sub-matrix of the sensing result matrix from the receiving electrodes RX01 to RX08 in the first period P51. Based on the specific encoding of the transmitting matrix, the post-state circuit (not shown) can decode the sensing result matrix in the first period P51 to correctly determine the touch events in the range where the transmitting electrodes TX01 to TX02 and the transmitting electrodes TX09 to TX10 are located.

Similarly, in the second period P52 shown in FIG. 5 (equivalent to the time T1 to T4 of Matrix 4), the driving circuit 111 uses the first transmitting sub-matrix (left half of Matrix 4) to drive the second transmitting electrodes TX03 to TX04 (equivalent to the transmitting electrodes TX [1] to TX [2] of Matrix 4) in the first transmitting electrode group, and the driving circuit 112 uses the second transmitting sub-matrix (right half of Matrix 4) to drive the second transmitting electrodes TX11 to TX12 (equivalent to the transmitting electrodes TX [3] to TX [4] of Matrix 4) in the second transmitting electrode group. In the third period P53 shown in FIG. 5 (equivalent to the time T1 to T4 of Matrix 4), the driving circuit 111 uses the first transmitting sub-matrix (left half of Matrix 4) to drive the third transmitting electrodes TX05 to TX06 (equivalent to the transmitting electrodes TX [1] to TX [2] of Matrix 4) in the first transmitting electrode group, and the driving circuit 112 uses the second transmitting sub-matrix (right half of Matrix 4) to drive the third transmitting electrodes TX13 to TX14 (equivalent to the transmitting electrodes TX [3] to TX [4] of Matrix 4) in the second transmitting electrode group. In the fourth period P54 shown in FIG. 5 (equivalent to the time T1 to T4 of Matrix 4), the driving circuit 111 uses the first transmitting sub-matrix (left half of Matrix 4) to drive the fourth transmitting electrodes TX07 to TX08 (equivalent to the transmitting electrodes TX [1] to TX [2] of Matrix 4) in the first transmitting electrode group, and the driving circuit 112 uses the second transmitting sub-matrix (right half of Matrix 4) to drive the fourth transmitting electrodes TX15 to TX16 (equivalent to the transmitting electrodes TX [3] to TX [4] of Matrix 4) in the second transmitting electrode group.

Based on the above relevant descriptions about Matrix 4 and by analogy, the first transmitting sub-matrix (e.g., the left half of Matrix 5, that is, the range of the transmitting electrodes TX [1] to TX [2]) and the second transmitting sub-matrix (e.g., the right half of Matrix 5, that is, the range of the transmitting electrodes TX [3] to TX [4]) of Matrix 5 can also be applied to the embodiment shown in FIG. 5.

FIG. 6 is a driving timing schematic diagram of the transmitting electrodes TX01 to TX16 according to yet another embodiment of the disclosure. The horizontal axis of FIG. 6 represents the transmitting electrodes TX01 to TX16, while the vertical axis represents different times t1 to t16. Referring to FIG. 1 and FIG. 6, during the same period (e.g., the first period P61, times t1 to t4), the driving circuit 111 uses the first transmitting sub-matrix of the transmitting matrix to drive the first transmitting electrodes TX01 to TX02 in the first transmitting electrode group, and the driving circuit 112 uses the second transmitting sub-matrix of the transmitting matrix to drive the first transmitting electrodes TX15 to TX16 in the second transmitting electrode group. The driving circuits 111 and 112 use different transmitting sub-matrices of the same transmitting matrix to drive different transmitting electrode groups of the touch panel 120 during the same period P61. Due to the driving circuits 111 and 112 both driving the touch panel 120 during the same period P61, the jitter components of the sensing results of the different driving circuits 111 and 112 are consistent (or similar) to each other.

Similarly, it can be inferred that during another same period (e.g., the second period P62, times t5 to t8), the driving circuit 111 uses the first transmitting sub-matrix to drive the second transmitting electrodes TX03 to TX04 in the first transmitting electrode group, and the driving circuit 112 uses the second transmitting sub-matrix to drive the second transmitting electrodes TX13 to TX14 in the second transmitting electrode group. During the third period P63 (times t9 to t12), the driving circuit 111 uses the first transmitting sub-matrix to drive the third transmitting electrodes TX05 to TX06 in the first transmitting electrode group, and the driving circuit 112 uses the second transmitting sub-matrix to drive the third transmitting electrodes TX11 to TX12 in the second transmitting electrode group. During the fourth period P64 (times t13 to t16), the driving circuit 111 uses the first transmitting sub-matrix to drive the fourth transmitting electrodes TX07 to TX08 in the first transmitting electrode group, and the driving circuit 112 uses the second transmitting sub-matrix to drive the fourth transmitting electrodes TX09 to TX10 in the second transmitting electrode group.

Taking the above Matrix 4 as an example, Matrix 4 can be split into a first transmitting sub-matrix (e.g., the left half of Matrix 4, that is, the range of the transmitting electrodes TX [1] to TX [2]) and a second transmitting sub-matrix (e.g., the right half of Matrix 4, that is, the range of the transmitting electrodes TX [3] to TX [4]). In the first period P61 shown in FIG. 6 (equivalent to the time T1 to T4 of Matrix 4), the driving circuit 111 uses the first transmitting sub-matrix (left half of Matrix 4) to drive the first transmitting electrodes TX01 to TX02 (equivalent to the transmitting electrodes TX [1] to TX [2] of Matrix 4) in the first transmitting electrode group, and the driving circuit 112 uses the second transmitting sub-matrix (right half of Matrix 4) to drive the first transmitting electrodes TX15 to TX16 (equivalent to the transmitting electrodes TX [3] to TX [4] of Matrix 4) in the second transmitting electrode group. Based on the driving of the transmitting electrodes TX01 to TX02 and the transmitting electrodes TX15 to TX16, the driving circuit 111 reads the first sensing result sub-matrix of the sensing result matrix from the receiving electrodes RX09 to RX16 in the first period P61, and the driving circuit 112 reads the second sensing result sub-matrix of the sensing result matrix from the receiving electrodes RX01 to RX08 in the first period P61. Based on the specific encoding of the transmitting matrix, the post-state circuit (not shown) can decode the sensing result matrix in the first period P61 to correctly determine the touch events in the range where the transmitting electrodes TX01 to TX02 and the transmitting electrodes TX15 to TX16 are located.

Similarly, in the second period P62 shown in FIG. 6 (equivalent to the time T1 to T4 of Matrix 4), the driving circuit 111 uses the first transmitting sub-matrix (left half of Matrix 4) to drive the second transmitting electrodes TX03 to TX04 (equivalent to the transmitting electrodes TX [1] to TX [2] of Matrix 4) in the first transmitting electrode group, and the driving circuit 112 uses the second transmitting sub-matrix (right half of Matrix 4) to drive the second transmitting electrodes TX13 to TX14 (equivalent to the transmitting electrodes TX [3] to TX [4] of Matrix 4) in the second transmitting electrode group. In the third period P63 shown in FIG. 6 (equivalent to the time T1 to T4 of Matrix 4), the driving circuit 111 uses the first transmitting sub-matrix (left half of Matrix 4) to drive the third transmitting electrodes TX05 to TX06 (equivalent to the transmitting electrodes TX [1] to TX [2] of Matrix 4) in the first transmitting electrode group, and the driving circuit 112 uses the second transmitting sub-matrix (right half of Matrix 4) to drive the third transmitting electrodes TX11 to TX12 (equivalent to the transmitting electrodes TX [3] to TX [4] of Matrix 4) in the second transmitting electrode group. In the fourth period P64 shown in FIG. 6 (equivalent to the time T1 to T4 of Matrix 4), the driving circuit 111 uses the first transmitting sub-matrix (left half of Matrix 4) to drive the fourth transmitting electrodes TX07 to TX08 (equivalent to the transmitting electrodes TX [1] to TX [2] of Matrix 4) in the first transmitting electrode group, and the driving circuit 112 uses the second transmitting sub-matrix (right half of Matrix 4) to drive the fourth transmitting electrodes TX09 to TX10 (equivalent to the transmitting electrodes TX [3] to TX [4] of Matrix 4) in the second transmitting electrode group.

Based on the above relevant descriptions about Matrix 4 and by analogy, the first transmitting sub-matrix (e.g., the left half of Matrix 5, that is, the range of the transmitting electrodes TX [1] to TX [2]) and the second transmitting sub-matrix (e.g., the right half of Matrix 5, that is, the range of the transmitting electrodes TX [3] to TX [4]) of Matrix 5 can also be applied to the embodiment shown in FIG. 6.

In the embodiment shown in FIG. 1, the driving circuit 111 includes a power circuit P11, a transmitting circuit TX111 and a receiving circuit RX111, and the driving circuit 112 includes a power circuit P12, a transmitting circuit TX112 and a receiving circuit RX112. The power circuit P11 supplies power to the transmitting circuit TX111 and the receiving circuit RX111. The transmitting circuit TX111 is coupled to the first transmitting electrode group (e.g., the transmitting electrodes TX01 to TX08, but not limited thereto) of the transmitting electrodes TX01 to TX16. The receiving circuit RX111 is coupled to the first receiving electrode group (e.g., the receiving electrodes RX09 to RX16, but not limited thereto) of the receiving electrodes RX01 to RX16. The power circuit P12 supplies power to the transmitting circuit TX112 and the receiving circuit RX112. The transmitting circuit TX112 is coupled to the second transmitting electrode group (e.g., the transmitting electrodes TX09 to TX16, but not limited thereto) of the transmitting electrodes TX01 to TX16. The receiving circuit RX112 is coupled to the second receiving electrode group (e.g., the receiving electrodes RX01 to RX08, but not limited thereto) of the receiving electrodes RX01 to RX16.

During the first period, the transmitting circuit TX111 uses the first transmitting sub-matrix to drive multiple first transmitting electrodes in the first transmitting electrode group, and the transmitting circuit TX112 uses the second transmitting sub-matrix to drive multiple first transmitting electrodes in the second transmitting electrode group. Based on the driving of the transmitting electrodes TX01 to TX16, the receiving circuits RX111 and RX112 read the sensing result matrix corresponding to the transmitting matrix from the receiving electrodes RX01 to RX16. For example, during the first period, the receiving circuit RX111 reads the first sensing result sub-matrix of the sensing result matrix from the first receiving electrode group, and the receiving circuit RX112 reads the second sensing result sub-matrix of the sensing result matrix from the second receiving electrode group. Based on the specific encoding of the transmitting matrix, the post-stage circuit (not shown) can decode the sensing result matrix to correctly determine the position of the touch event of the touch panel 120.

During the first period when the transmitting circuit TX111 drives the transmitting electrodes, it is inevitable that the noise caused by the driving behavior will be coupled to the sensing results of the receiving circuit RX111 towards the touch panel 120 through the internal coupling path (e.g., power network of the power circuit P11) of the driving circuit 111, thereby introducing a jitter component into the sensing results. Similarly, during the first period when the transmitting circuit TX112 drives the first transmitting electrodes, the noise caused by the driving behavior will be coupled to the sensing results of the receiving circuit RX112 towards the touch panel 120 through the internal coupling path (e.g., power network of the power circuit P12) of the driving circuit 112, thereby introducing a jitter component into the sensing results. The transmitting circuit TX111 and the transmitting circuit TX112 use different transmitting sub-matrices of the same transmitting matrix to drive different transmitting electrode groups of the touch panel 120 during the same period. Due to the transmitting circuit TX111 and the transmitting circuit TX112 both driving the touch panel 120 during the same period P31, the jitter components of the sensing results of the receiving circuit RX111 and the receiving circuit RX112 are consistent (or similar) to each other. Due to the jitter components of the sensing results of the receiving circuit RX111 and the receiving circuit RX112 being consistent (or similar) to each other, the situation in which the post-stage circuit (not shown) misjudges the touch event of the touch panel 120 can be effectively reduced.

The relevant descriptions of the embodiments shown in FIG. 3 to FIG. 6 can also be applied to the operations of the transmitting circuits TX111 and TX112. During the second period, the transmitting circuit TX111 uses the first transmitting sub-matrix to drive multiple second transmitting electrodes in the first transmitting electrode group, and the transmitting circuit TX112 uses the second transmitting sub-matrix to drive multiple second transmitting electrodes in the second transmitting electrode group. During the third period, the transmitting circuit TX111 uses the first transmitting sub-matrix to drive multiple third transmitting electrodes in the first transmitting electrode group, and the transmitting circuit TX112 uses the second transmitting sub-matrix to drive multiple third transmitting electrodes in the second transmitting electrode group. During the fourth period, the transmitting circuit TX111 uses the first transmitting sub-matrix to drive multiple fourth transmitting electrodes in the first transmitting electrode group, and the transmitting circuit TX112 uses the second transmitting sub-matrix to drive multiple fourth transmitting electrodes in the second transmitting electrode group.

To sum up, the driving circuits 111 and 112 use different transmitting sub-matrices of the same transmitting matrix to drive different transmitting electrode groups of the touch panel 120 during the same period, so that the jitter components of the sensing results of different driving 5 circuits are consistent (or similar) to each other. Due to the jitter components of the sensing results of the driving circuits 111 and 112 being consistent (or similar) to each other, the situation in which the post-stage circuit (not shown) misjudges the touch event of the touch panel 120 can be effectively reduced.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A touch driving device, configured to drive a plurality of transmitting electrodes of a touch panel by using a transmitting matrix, and read a sensing result matrix corresponding to the transmitting matrix from a plurality of receiving electrodes of the touch panel, the touch driving device comprising:

a first driving circuit, coupled to a first transmitting electrode group of the transmitting electrodes and coupled to a first receiving electrode group of the receiving electrodes, wherein the first driving circuit uses a first transmitting sub-matrix of the transmitting matrix to drive the first transmitting electrode group during a first period, and reads a first sensing result sub-matrix of the sensing result matrix from the first receiving electrode group; and a second driving circuit, coupled to a second transmitting electrode group of the transmitting electrodes and coupled to a second receiving electrode group of the receiving electrodes, wherein the second driving circuit uses a second transmitting sub-matrix of the transmitting matrix to drive the second transmitting electrode group during the first period, and reads a second sensing result sub-matrix of the sensing result matrix from the second receiving electrode group, wherein during the first period, the first driving circuit uses the first transmitting sub-matrix to drive a plurality of first transmitting electrodes in the first transmitting electrode group, and the second driving circuit uses the second transmitting sub-matrix to drive a plurality of second transmitting electrodes in the second transmitting electrode group; and during a second period, the first driving circuit uses the first transmitting sub-matrix to drive a plurality of third transmitting electrodes in the first transmitting electrode group, and the second driving circuit uses the second transmitting sub-matrix to drive a plurality of fourth transmitting electrodes in the second transmitting electrode group.

2. The touch driving device according to claim 1, wherein, during a third period, the first driving circuit uses the first transmitting sub-matrix to drive a plurality of fifth transmitting electrodes in the first transmitting electrode group, and the second driving circuit uses the second transmitting sub-matrix to drive a plurality of sixth transmitting electrodes in the second transmitting electrode group; and during a fourth period, the first driving circuit uses the first transmitting sub-matrix to drive a plurality of seventh transmitting electrodes in the first transmitting electrode group, and the second driving circuit uses the second transmitting sub-matrix to drive a plurality of eighth transmitting electrodes in the second transmitting electrode group.

3. The touch driving device according to claim 1, wherein, the first driving circuit comprises a first power circuit, a first transmitting circuit and a first receiving circuit;

the first power circuit supplies power to the first transmitting circuit and the first receiving circuit;

the first transmitting circuit is coupled to the first transmitting electrode group;

the first receiving circuit is coupled to the first receiving electrode group;

the second driving circuit comprises a second power circuit, a second transmitting circuit and a second receiving circuit;

the second power circuit supplies power to the second transmitting circuit and the second receiving circuit;

the second transmitting circuit is coupled to the second transmitting electrode group; and the second receiving circuit is coupled to the second receiving electrode group.

4. The touch driving device according to claim 3, wherein, during the first period, the first transmitting circuit uses the first transmitting sub-matrix to drive the plurality of first transmitting electrodes in the first transmitting electrode group, and the second transmitting circuit uses the second transmitting sub-matrix to drive the plurality of second transmitting electrodes in the second transmitting electrode group; and during the second period, the first transmitting circuit uses the first transmitting sub-matrix to drive the plurality of third transmitting electrodes in the first transmitting electrode group, and the second transmitting circuit uses the second transmitting sub-matrix to drive the plurality of fourth transmitting electrodes in the second transmitting electrode group.

5. The touch driving device according to claim 4, wherein, during a third period, the first transmitting circuit uses the first transmitting sub-matrix to drive a plurality of fifth transmitting electrodes in the first transmitting electrode group, and the second transmitting circuit uses the second transmitting sub-matrix to drive a plurality of sixth transmitting electrodes in the second transmitting electrode group; and during a fourth period, the first transmitting circuit uses the first transmitting sub-matrix to drive a plurality of seventh transmitting electrodes in the first transmitting electrode group, and the second transmitting circuit uses the second transmitting sub-matrix to drive a plurality of eighth transmitting electrodes in the second transmitting electrode group.

6. An operating method of a touch driving device, the touch driving device being configured to drive a plurality of transmitting electrodes of a touch panel by using a transmitting matrix, and the touch driving device reading a sensing result matrix corresponding to the transmitting matrix from a plurality of receiving electrodes of the touch panel, the operating method comprising:

during a first period, using a first transmitting sub-matrix of the transmitting matrix to drive a first transmitting electrode group of the transmitting electrodes by a first driving circuit of the touch driving device, and using a second transmitting sub-matrix of the transmitting matrix to drive a second transmitting electrode group of the transmitting electrodes by a second driving circuit of the touch driving device;

reading a first sensing result sub-matrix of the sensing result matrix from a first receiving electrode group of the receiving electrodes by the first driving circuit; and reading a second sensing result sub-matrix of the sensing result matrix from a second receiving electrode group of the receiving electrodes by the second driving circuit;

during the first period, using the first transmitting sub-matrix to drive a plurality of first transmitting electrodes in the first transmitting electrode group by the first driving circuit, and using the second transmitting sub-matrix to drive a plurality of second transmitting electrodes in the second transmitting electrode group by the second driving circuit; and during a second period, using the first transmitting sub-matrix to drive a plurality of third transmitting electrodes in the first transmitting electrode group by the first driving circuit, and using the second transmitting sub-matrix to drive a plurality of fourth transmitting electrodes in the second transmitting electrode group by the second driving circuit.

7. The operating method according to claim 6, further comprising:

during a third period, using the first transmitting sub-matrix to drive a plurality of fifth transmitting electrodes in the first transmitting electrode group by the first driving circuit, and using the second transmitting sub-matrix to drive a plurality of sixth transmitting electrodes in the second transmitting electrode group by the second driving circuit; and during a fourth period, using the first transmitting sub-matrix to drive a plurality of seventh transmitting electrodes in the first transmitting electrode group by the first driving circuit, and using the second transmitting sub-matrix to drive a plurality of eighth transmitting electrodes in the second transmitting electrode group by the second driving circuit.

* * * * *